US008825760B1

(12) United States Patent  
Harris

(10) Patent No.: US 8,825,760 B1
(45) Date of Patent: Sep. 2, 2014

(54) EVENT PLANNING SYSTEM THAT PROVIDES SOCIAL NETWORK FUNCTIONS IN ADVANCE OF AN ACTUAL EVENT

(76) Inventor: Scott C. Harris, Rancho Santa Fe, CA (US)

(*) Notice: Subject to any disclaimer, the term of this patent is extended or adjusted under 35 U.S.C. 154(b) by 408 days.

(21) Appl. No.: 13/191,162

(22) Filed: Jul. 26, 2011

Related U.S. Application Data

(60) Provisional application No. 61/372,457, filed on Aug. 10, 2010.

(51) Int. Cl.
G06F 13/00 (2006.01)
G06Q 10/10 (2012.01)

(52) U.S. Cl.
CPC ............................ G06Q 10/10 (2013.01)
USPC ........................................ 709/204

(58) Field of Classification Search
CPC ............... H04L 29/08072; H04L 29/06027; H04L 12/581; G06Q 10/10
USPC ........................................ 709/204
See application file for complete search history.

(56) References Cited

U.S. PATENT DOCUMENTS 7,503,070 B1  3/2009  Alstyne et al.
7,606,168 B2  10/2009 Robinson et al.
7,707,251 B2  4/2010  Birch
2003/0050977 A1  3/2003  Puthenkulam et al.
2008/0033739 A1  2/2008  Zuckerberg et al.
2008/0214148 A1  9/2008  Ramer et al.
2009/0013263 A1* 1/2009  Fortnow et al. ............... 715/753
2009/0058615 A1  3/2009  Schultz
2009/0144392 A1  6/2009  Wang et al.
2009/0313235 A1  12/2009 Gounares et al.
2010/0057859 A1  3/2010  Shen et al.
2010/0115426 A1  5/2010  Liu et al.
2010/0198581 A1  8/2010  Ellis
2011/0044354 A1  2/2011  Wei
2011/0055683 A1  3/2011  Jiang
2011/0093709 A1  4/2011  Lunt et al.

* cited by examiner

Primary Examiner — Robert B Harrell
(74) Attorney, Agent, or Firm — Law Office of Scott C. Harris, Inc.

(57) ABSTRACT

A computer system, with a user interface and a processor, and a program that operates on the processor to control creation of an event, like a party. Different people are invited. Area information about a specific area in which the event is occurring is obtained. People information is also obtained from a social network database that allows people to enter information about themselves, said people information indicative of personal information about said plural different people who are associated with the event. A virtual version of the specific area, along with different places in the specific area and said plural different people in the specific area is shown, along with social network information, seating, information about clothing for the event and/or other personal things.

20 Claims, 2 Drawing Sheets

EVENT PLANNING SYSTEM THAT PROVIDES SOCIAL NETWORK FUNCTIONS IN ADVANCE OF AN ACTUAL EVENT

This application claims priority from Provisional application number 61/372,457, filed Aug. 10, 2010, the entire contents of which are herewith incorporated by reference.

BACKGROUND

Social networking is known as a way to connect between people. For example, the different social networks allow different people to create connections with other people, and then to carry out various functions on the social network. Facebook™, for example, allows the user to track their own or others' actions through the social network, so that others can see those actions. Linked In™ allows users to connect based on previous jobs, so the people once connected through their jobs being "work friends" can later stay in touch. Other social networks allow other actions.

Social networks try to emulate the social relationships between people in various ways.

SUMMARY

The present application describes a new function for a computer network of a type that allows different people to communicate different events.

According to an embodiment, and various kinds of planning functions can be carried out over a computer network.

BRIEF DESCRIPTION OF THE DRAWINGS in the drawings.

DETAILED DESCRIPTION

Figure 1:
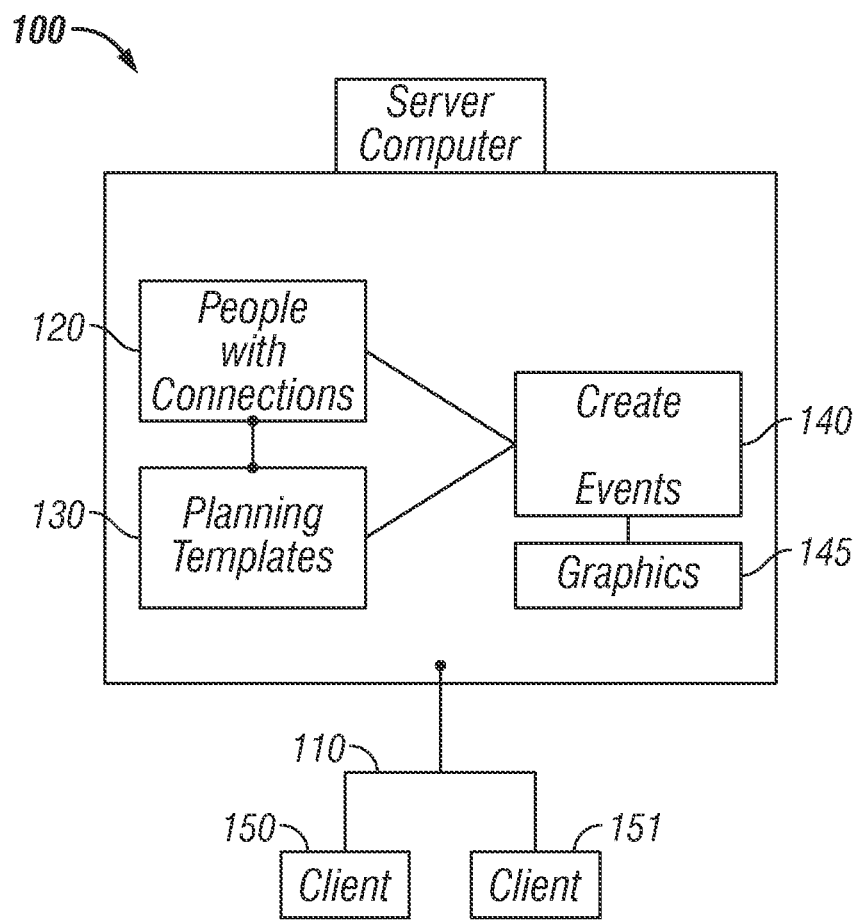
FIG. 1 shows a computer network of the type used according to embodiments.

An embodiment of a computer system which can carry out the techniques described herein is shown in FIG. 1. FIG. 1 shows a server computer system 100 that is connected to the Internet 110. The server computer system includes processing parts as conventional which can operate according to a stored program to allow a number of different functions which are conventionally referred to as social networking. While this term "social network" is used to describe this process, it should be understood that any computer or machine or operation that can connect between people, preferably one which is publicly accessible such as over the Internet or over a cellular network, can be used for this purpose.

The server computer 100 includes a number of functions. 120 includes a function of people and connections. For each of a plurality of people, their contact information and some other information about those people is stored. This may include likes and dislikes, pictures, or other conventional information of this type. This may also include connections, that is people that users know in one way or another, either socially or through a work relationship or some other relationship.

The embodiment also includes various kinds of planning templates 130. The planning templates are as described herein.

Based on the combination of the people with their connections 120 and the planning templates 130, the server computer creates events at 140, and creates graphics indicative of those events at 145. The templates, graphics, and other information is converted into a form which can be read by client computers, for example images and forms of HTML. This information is made available to any of the plurality of clients shown generically as 150 and 151, although it should be understood that any number of clients can be connected in this way.

Figure 2:
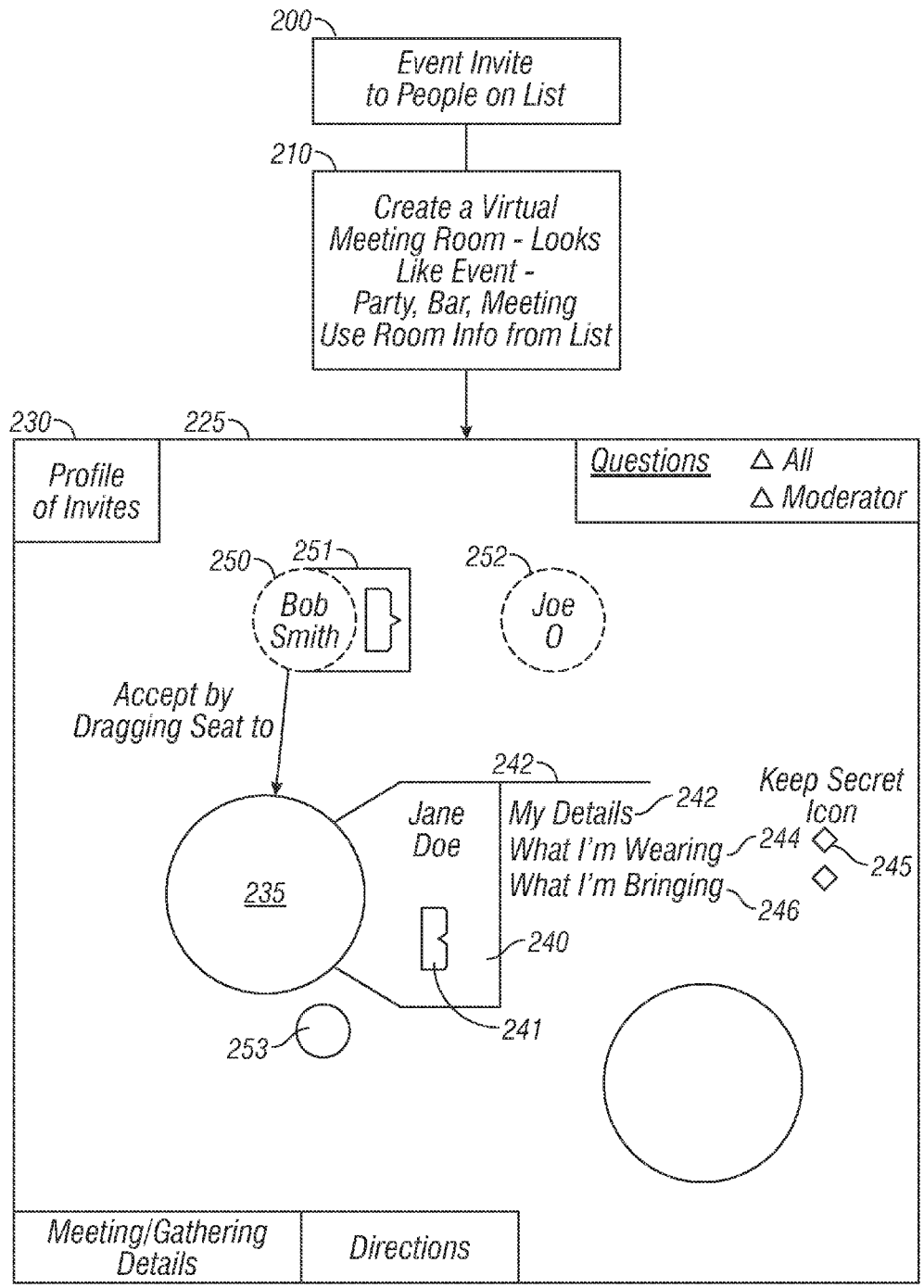
FIG. 2 shows an operation in a virtual room created by the network.

In an embodiment, the social network is used to plan for different events. Exemplary events that can be planned may include wedding receptions, parties, outings at bars, and the like. The operation may use the server computer to carry out the flowchart of FIG. 2, under control of one or more clients.

At 200, an event organizer routine running on the computer initiates an event invitation, by setting up the event. This may include selecting an event venue from an existing event venue on a list, for example of a known meeting room, bar, or event room. The event organizer may also involve setting, from the templates, the kind of event that will occur, and the tables or other organization of the room. The event invite is then sent to either some or all people on the list with whom the user has connections. Each person presumably has some information about those connections beyond their name and contact information, so that when a virtual room is created as shown herein, more information about those people can be provided.

At 210, based on this information, a virtual meeting room is created. The virtual meeting room, shown as 225, looks like the event, using the room information from the list or selected from the template.

In the embodiment, the virtual meeting room may include the profile of the inviter at 230. This may include any personal information about the person who is inviting the others, as appropriate. There may also be tables such as 235, or alternatively just places to stand. People who accepted the event invitation are shown in detail such as 240 which shows the person who accepted the event invitation as well as their picture at 241, and their details at 242.

In addition, the users can specify different things about their specific own attendance. At 244, the user 240 may specify for example what they are wearing, for example a purple top and white skirt. This allows other users to find out the kind of dress that people will be wearing, and also to avoid two people dressing exactly the same, and to help people decide what kind of clothing to wear. The user can also opt to keep the information secret at 245, or to keep it partially secret.

One embodiment may allow people to enter information about what they will wear, and uses a computer to compare that information against information indicating what others have indicated that they will wear. This can be done, for example, without specifically telling anyone specifically (or in another embodiment only telling the party organizer) what the others say they will wear. The computer compares, for example, style of dress, colors, degree of formality of the dress (jeans, short sleeve shirts; or suits, or black tie/evening apparel) against what others indicate they will wear. The user can be given guidelines like "someone else says they will be wearing a purple dress" or "others say they will be wearing evening attire, which is much more formal than what you're wearing.

246 may indicate what the user is bringing, dessert, wine or nothing, for example. Users who have been invited but have not yet accepted are shown in dotted lines, such as 250 showing Bob Smith. This shows Bob Smith's profile from the social network and Bob Smith's picture 251, but does not show other information about Bob who has not yet accepted.

Bob Smith can accept. After Bob accepts, Bob can drag or otherwise relocate his profile to a desired seat.

In another embodiment, only the inviter can set seats.

Other people who have not yet accepted are shown as 252, while there may be other people who have accepted shown as 253.

The gathering details are shown at 260, which may show the purpose of the gathering and other information. Information such as directions may be shown at 251. In this way, this may provide a virtual room that shows a preview of the event, to help people properly plan to actually attend the event. This may be used, for example, to help people decide where people are going to sit or stand at the party; for people to find out information about people who are sitting near them or at their tables. Information about those people, from their social network profiles is accessable.

In one embodiment, everyone who will be at the gathering, may have their "profile" from the social network, displayed. People who are unconnected may see only a public profile. Those who are connected may see more information, e.g., that information which members show only to their friends, for example. In this way, people can find out information about others who will be attending the event.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of networks can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system, including a user interface and a processor, and a program that operates on said processor, said processor operating according to said program to:
   create an event which plural different people will attend in person at a first time;
   obtain area information about a specific area in which the event is occurring, the area being the area where the event will occur at the first time and where the different people will attend in person at the first time;
obtain people information from a social network database that allows people to enter information about themselves, said people information indicative of personal information about said plural different people associated with the event;
   provide information which shows a virtual version of the specific area at a second time earlier than the first time, along with different places in the specific area and said plural different people in the specific area;
   accept information from said plural different people over the network connection at the second time about specific clothing that the specific people will wear to the event at the first time;
   said information which shows comprises said plural different people, said virtual version of said specific area, and said people information.

2. A computer system as in claim 1,
   wherein said processor provides information indicative of said clothing to other users at a time prior to said first time.

3. A computer system as in claim 2, wherein said information about said plural different people includes information about items that said different people will bring to the event.

4. A computer system as in claim 1, where said virtual version shows said plural different people at specific locations in the area representing a location chart in the area and places where specific people will be assigned on said location chart.

5. A computer system as in claim 4, wherein said places where said specific people will be assigned is a seating chart, showing said different people inside a layout of the specific area.

6. A computer system as in claim 1, wherein said area information is obtained from a template.

7. A computer system as in claim 1, wherein said area information is obtained from stored information about the specific area.

8. A computer system as in claim 1, wherein said processor sends invitations over the social network database, which is the same social network database from which said people information is received.

9. A computer system as in claim 1, where said processor controls showing information about said specific clothing to others who will attend the event at a time prior to said first time.

10. A computer system as in claim 1, wherein said processor provides information about whether clothing that a user indicates they will wear is similar to other clothing that other users indicate they will wear, but does not provide information about said other clothing.

11. A computer system, including a user interface and a processor, and a program that operates on said processor, and a connection to a network, said processor operating according to said program to:
   create an event which plural different people will attend;
   accept an indication of people to attend said event;
   obtain people information from a social network database, said people information indicative of personal information about said plural different people associated with the event;
   displaying information said plural different people associated with the event, including said personal information to said plural different people who will attend the event, said displaying comprising determining for a user using said processor and said program, whether said user is connected with other users on said social network database, and providing only public information about a second of said plural different people with whom said user is not connected on said social network database, and providing private information from said social network database about a third of said different people from said social network database with whom said user is connected on said social network database.

12. A computer system as in claim 11, wherein said processor accepts information from said different people, and displays information about said information from said different people which has been accepted, in addition to said information from the social network.

13. A computer system as in claim 12, wherein said information about said different people includes information about specific clothing that said different people indicate that they will wear to the event at the first time, and where said processor controls showing information about said specific clothing at said second time to others of said different people.

14. A computer system as in claim 13, wherein said information about said specific clothing does not show actual information about the specific clothing, but provides an indication at the second time that others will be wearing similar specific clothing at the first time.

15. A computer system as in claim 12, wherein said information about said different people includes information about items that said specific people will bring to the event.

16. A computer system as in claim 11, wherein said event is one that will occur at a first time and be attended in person, and said processor is also programmed for showing a virtual version of a specific area where the event will occur at a second time prior to the first time, along with different places in the specific area and said plural different people in the specific area at the second time;

where said plural different people can each see said virtual version of said specific area and said people information at the second time.

17. A computer system as in claim 16, where said virtual version shows said plural different people at the second time, at specific locations in the area representing a location chart in the area and places where said different people will be assigned at the first time, on said location chart.

18. A computer system, including a user interface and a processor, and a program that operates on said processor, said processor operating according to said program to:

receive information about an event which plural different people will attend in person at a first time, via an invitation to said event;

receive area information about a specific area in which the event is occurring at the first time;

show a virtual version of the specific area at a second time prior to the first time, along with different places in the specific area and said plural different people in the specific area, including seats in the specific area, and virtual icons indicative of the people in the specific area;

show said virtual version of said specific area and said people information on said computer system, allow a user of the computer to accept said invitation to said event on said computer system; and allow said user of the computer system to select a seat at said second time, where the user will sit in the specific area, by viewing information indicative of other people in the specific area at specific seats and by dragging an icon indicative of the user to a location in the specific area indicative of another specific seat at the second time.

19. A computer system as in claim 18, wherein said processor further operates to obtain people information from a source remote from the computer system over a network connection, from a social network site that allows people to enter information about themselves, said people information indicative of personal information about said plural different people who associated with the event, where said user obtains different amounts of information about said plural different people depending on whether said user is connected with said different people on said social network.

20. A computer system as in claim 18, wherein said processor further operates to automatically accept the invitation responsive to the user dragging said icon indicative of the user to said specific seat.

\* \* \* \* \*